(12) United States Patent
Sugishima

(10) Patent No.: US 10,061,261 B2
(45) Date of Patent: Aug. 28, 2018

(54) COUPLING MECHANISM, AND SHEET FEED DEVICE AND IMAGE FORMING APPARATUS INCLUDING SAME

(71) Applicant: KYOCERA Document Solutions Inc., Osaka (JP)

(72) Inventor: Yoshio Sugishima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 68 days.

(21) Appl. No.: 15/460,868

(22) Filed: Mar. 16, 2017

(65) Prior Publication Data

US 2017/0285562 A1  Oct. 5, 2017

(30) Foreign Application Priority Data

Apr. 5, 2016  (JP) ................................ 2016-076004

(51) Int. Cl.
| | |
|---|---|
| *B65H 1/14* | (2006.01) |
| *G03G 21/16* | (2006.01) |
| *G03G 15/00* | (2006.01) |
| *F16D 1/10* | (2006.01) |
| *B65H 1/04* | (2006.01) |

(52) U.S. Cl.
CPC ........... *G03G 21/1647* (2013.01); *B65H 1/14* (2013.01); *G03G 15/6502* (2013.01); *G03G 15/6529* (2013.01); *B65H 1/04* (2013.01); *F16D 1/101* (2013.01); *G03G 15/6511* (2013.01)

(58) Field of Classification Search
None
See application file for complete search history.

(56) References Cited

U.S. PATENT DOCUMENTS

| | | | |
|---|---|---|---|
| 6,161,829 A * | 12/2000 | Kusumi .................... | B65H 1/14 271/118 |
| 2007/0001380 A1 * | 1/2007 | Kusumi ............. | G03G 15/6511 271/157 |
| 2007/0102868 A1 * | 5/2007 | Matsumoto .............. | B65H 1/14 271/127 |
| 2008/0304865 A1 | 12/2008 | Omura et al. | |
| 2011/0049789 A1 * | 3/2011 | Kato ........................ | B65H 1/14 271/162 |
| 2013/0113157 A1 * | 5/2013 | Fujita ...................... | B65H 1/266 271/126 |

FOREIGN PATENT DOCUMENTS

JP   2008-304776 A   12/2008

* cited by examiner

*Primary Examiner* — Jill Culler
(74) *Attorney, Agent, or Firm* — Stein IP, LLC

(57) ABSTRACT

A coupling mechanism of the present disclosure includes a drive transmission member, a coupling member and a biasing member. The drive transmission member includes a shaft portion and an engagement pin. The coupling member includes a plurality of engagement protrusions and a holding protrusion which is smaller than the engagement protrusion. The holding protrusion makes contact with the engagement pin in a state where the engagement pin makes contact with the pressing surface. A load in a reverse rotation direction is applied from the holding protrusion to the engagement pin when the coupling member is reversely rotated.

5 Claims, 7 Drawing Sheets

COUPLING MECHANISM, AND SHEET FEED DEVICE AND IMAGE FORMING APPARATUS INCLUDING SAME

This application is based upon and claims the benefit of priority from the corresponding Japanese Patent Application No. 2016-076004 filed on Apr. 5, 2016, the entire contents of which are incorporated herein by reference.

BACKGROUND

The present disclosure relates to a coupling mechanism and a sheet feed device and an image forming apparatus that include such a coupling mechanism, and particularly relates to a coupling mechanism that includes a drive transmission member to which a driven member is fixed and a coupling member which is engaged with the drive transmission member and a sheet feed device and an image forming apparatus that include such a coupling mechanism A paper feed cassette (sheet storage cassette) is used as a cassette for feeding cut paper or the like in an image forming apparatus such as a copying machine or a printer. In the paper feed cassette, a large number of sheets before printing are previously stocked, and a paper feed roller, a pickup roller and the like provided in the vicinity of the paper feed cassette are used to separate and supply the sheets one by one from the uppermost layer of a bundle of sheets stacked within the paper feed cassette.

There is a paper feed cassette that includes a sheet loading plate in which sheets are placed on its upper surface. In the sheet loading plate, an upstream end in a paper feed direction is supported to the inside of the bottom surface of the paper feed cassette, and the sheet loading plate can be rotated about the support point with a downstream end portion in the paper feed direction serving as a rotation end (free end). In the paper feed cassette, an actuation plate which makes contact with the sheet loading plate from below so as to raise and lower the rotation end of the sheet loading plate and a drive transmission member to which the actuation plate is fixed are provided. In the main body of the apparatus, a coupling member is provided which is engaged with the drive transmission member so as to transmit a rotation drive force to the drive transmission member.

For example, the drive transmission member is formed with a shaft portion to which the actuation plate is fixed and an engagement pin which is fixed to the end portion of the shaft portion on the side opposite to the actuation plate and which is extended in a direction intersecting the shaft portion. On the coupling member, a plurality of engagement protrusions are provided which are protruded in the axial direction of the shaft portion and which are engaged with the engagement pin. In a state where the engagement pin is inserted between the engagement protrusions, the coupling member is positively rotated, and thus the engagement pin is pressed by the pressing surface of the engagement protrusion in the positive rotation direction, with the result that the drive transmission member is positively rotated. In this way, the actuation plate is rotated so as to stand up, and thus the sheet loading plate is raised.

SUMMARY

A coupling mechanism according to a first aspect of the present disclosure includes a drive transmission member, a coupling member and a biasing member. The drive transmission member includes a shaft portion to which a driven member is fixed and an engagement pin which is fixed to an end portion of the shaft portion on a side opposite to the driven member and which is extended in a direction intersecting the shaft portion. A coupling member includes a plurality of engagement protrusions which are protruded in an axial direction of the shaft portion and which are engaged with the engagement pin and a holding protrusion which is arranged between the engagement protrusions and which is protruded in the axial direction a smaller amount of protrusion than the engagement protrusion, and is provided such that the coupling member can be moved in the axial direction. The biasing member biases the coupling member in a direction in which the coupling member is engaged with the drive transmission member. The engagement protrusion includes a pressing surface which is parallel to the axial direction and an inclination surface which is inclined toward a tip end portion of the pressing surface in the axial direction. The holding protrusion is arranged in such a position as to make contact with the engagement pin in a state where the engagement pin makes contact with the pressing surface. The engagement pin is pressed by the pressing surface when the coupling member is positively rotated, a rotation drive force in a positive rotation direction is transmitted from the coupling member to the engagement pin, a load in a reverse rotation direction is applied from the holding protrusion to the engagement pin when the coupling member is reversely rotated and the engagement pin rides over the holding protrusion and the engagement protrusion when a load which is equal to or more than a predetermined value is applied from the holding protrusion and the engagement protrusion.

Further other objects of the present disclosure and specific advantages obtained by the present disclosure will become more apparent from the description of an embodiment given below.

DETAILED DESCRIPTION

An embodiment of the present disclosure will be described below with reference to drawings.

Figure 1:
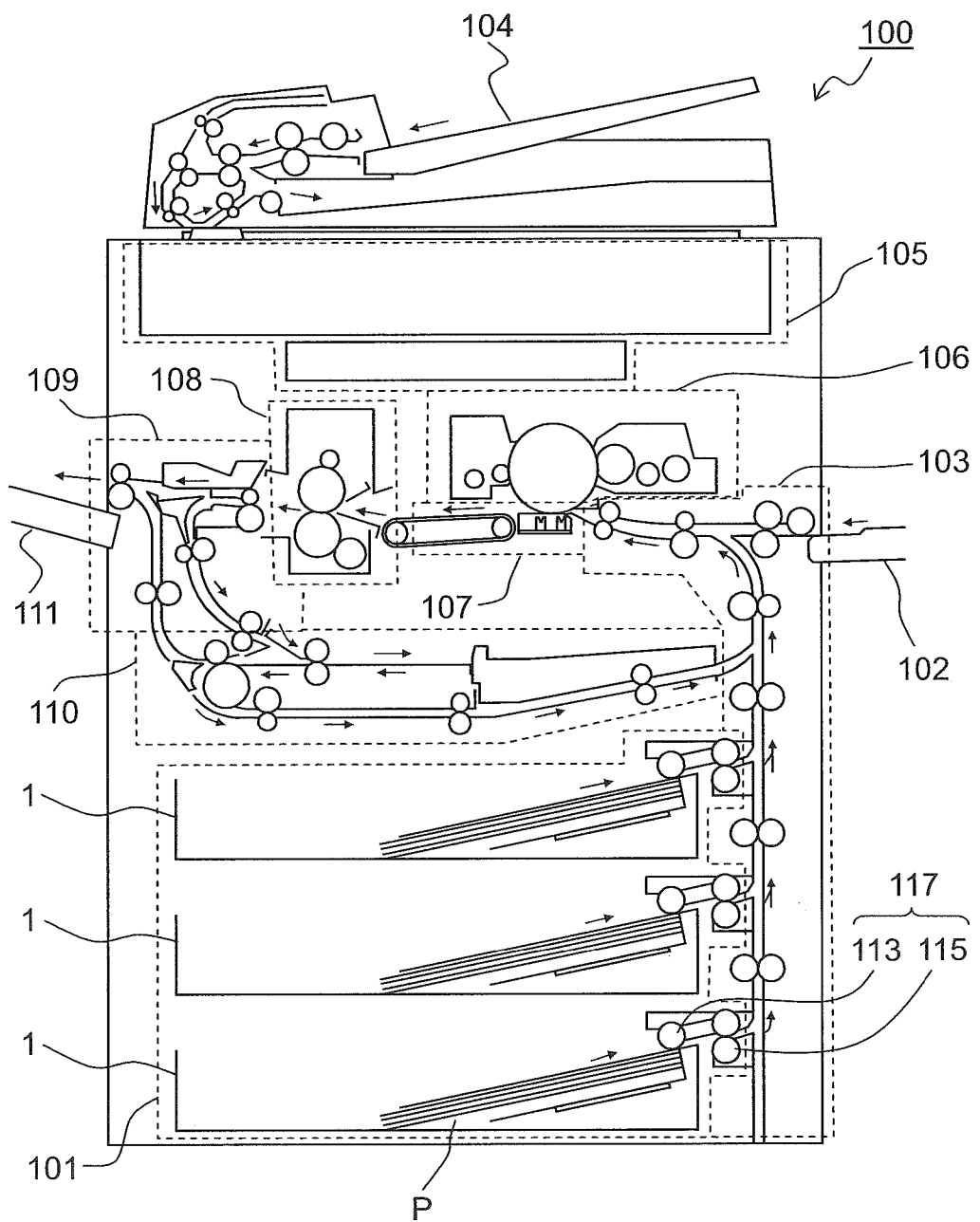
FIG. 1 is a side cross-sectional view showing the internal structure of an image forming apparatus which incorporates a coupling mechanism according to an embodiment of the present disclosure.

FIG. 1 is a side cross-sectional view showing the internal structure of an image forming apparatus 100 which incorporates a coupling mechanism according to an embodiment of the present disclosure. The solid-line arrows in the figure indicate a transport path and a transport direction.

In FIG. 1, a cassette-type paper feed portion 101 is arranged in a lower portion of the image forming apparatus 100. In the cassette-type paper feed portion 101, a plurality of (here, three) paper feed cassettes (sheet storage cassettes) 1 are provided. Within the paper feed cassette 1, sheets P such as cut paper before printing are loaded and stored, and a paper feed mechanism 117 formed with a pickup roller 113 and a paper feed roller pair 115 is used to separate the sheets P one by one and feed out the sheet P.

A manual paper feed portion 102 is provided outside an upper portion of the right side surface of the image forming apparatus 100. On the manual paper feed portion 102, sheets P whose sizes and thicknesses are different from the cassette-type paper feed portion 101 and items, such as an OHP sheet, an envelope, a postcard and an invoice, which are fed thereto one by one are placed.

Within the image forming apparatus 100, a sheet transport portion 103 is arranged. The sheet transport portion 103 is located rightward of the cassette-type paper feed portion 101 on the downstream side in a paper feed direction (sheet feed direction), and is located leftward of the manual paper feed portion 102 on the downstream side in the paper feed direction. The sheet P fed out from the cassette-type paper feed portion 101 is transported by the sheet transport portion 103 along the side surface of the main body of the image forming apparatus 100 vertically upward, and the sheet P fed out from the manual paper feed portion 102 is transported horizontally.

On the upper surface of the image forming apparatus 100, an original document transport device 104 is arranged, and an image reading portion 105 is arranged below it. When a user copies an original document, a plurality of original documents on which images such as characters, figures and patterns are drawn are loaded on the original document transport device 104. In the original document transport device 104, the original documents are separated and fed out one by one, and image data thereon is read by the image reading portion 105.

Below the image reading portion 105 on the downstream side in the sheet transport direction of the sheet transport portion 103, an image formation portion 106 and a transfer portion 107 are arranged. In the image formation portion 106, based on the image data read by the image reading portion 105, the electrostatic latent image of an original document image is formed, and the electrostatic latent image is developed to form a toner image. On the other hand, in synchronization with timing at which the toner image is formed in the image formation portion 106, the sheet P is transported from the cassette-type paper feed portion 101 through the sheet transport portion 103 to the transfer portion 107. The toner image formed in the image formation portion 106 is transferred onto the sheet P in the transfer portion 107.

On the downstream side of the transfer portion 107, a fixing portion 108 is arranged. The sheet P to which the unfixed toner image is transferred in the transfer portion 107 is transported to the fixing portion 108 and is passed through the nip portion of a fixing roller pair formed with a heating roller and a pressure roller, and thus the unfixed toner image on the sheet P is fixed so as to form a permanent image.

In the vicinity of the left side surface of the image forming apparatus 100 on the downstream side of the fixing portion 108, an ejection-branch portion 109 is arranged. When double-sided printing is not performed, the sheet P which is ejected from the fixing portion 108 is ejected from the ejection-branch portion 109 to a sheet ejection tray 111 which is provided outside the left side surface of the image forming apparatus 100.

Below a portion from the image formation portion 106 to the ejection-branch portion 109 and above the cassette-type paper feed portion 101, a double-sided printing unit 110 is arranged. When double-sided printing is performed, the sheet P which is ejected from the fixing portion 108 is fed through the ejection-branch portion 109 to the double-sided printing unit 110. In the sheet P which is fed to the double-sided printing unit 110, the front and back thereof are reversed by switchback, and the sheet P is passed through the sheet transport portion 103 again and is transported to the transfer portion 107 while the surface on which no image is formed is directed upward.

Figure 2:
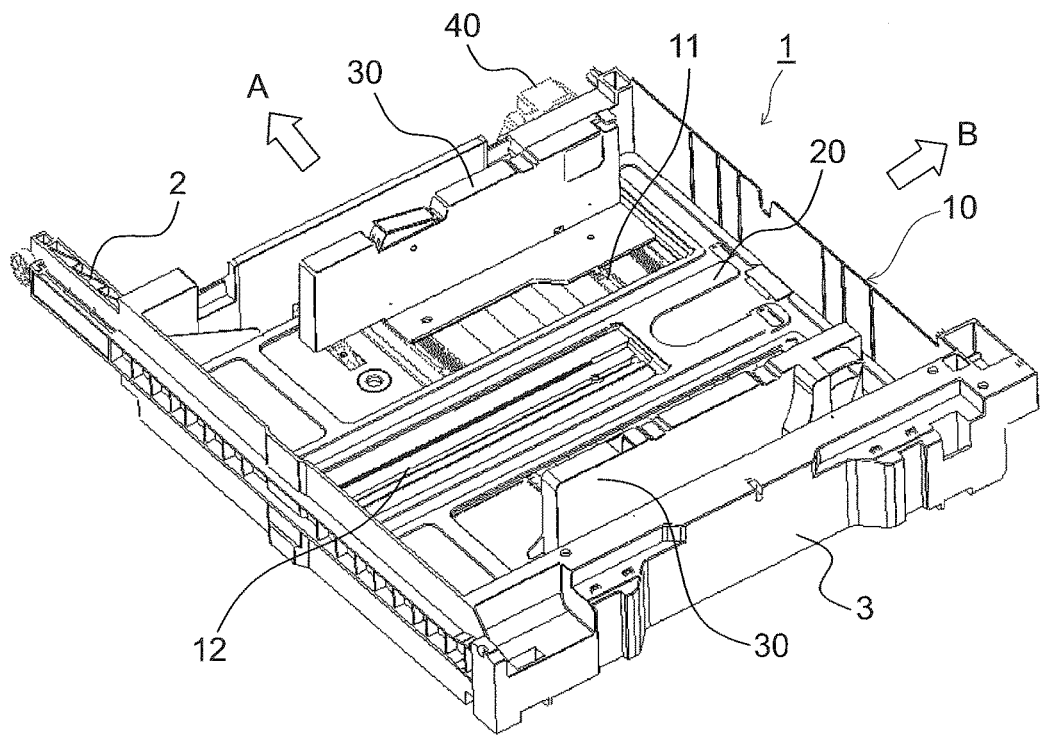
FIG. 2 is an external perspective view when a paper feed cassette in a paper feed device in the embodiment of the present disclosure is seen from above a front surface side.
Figure 3:
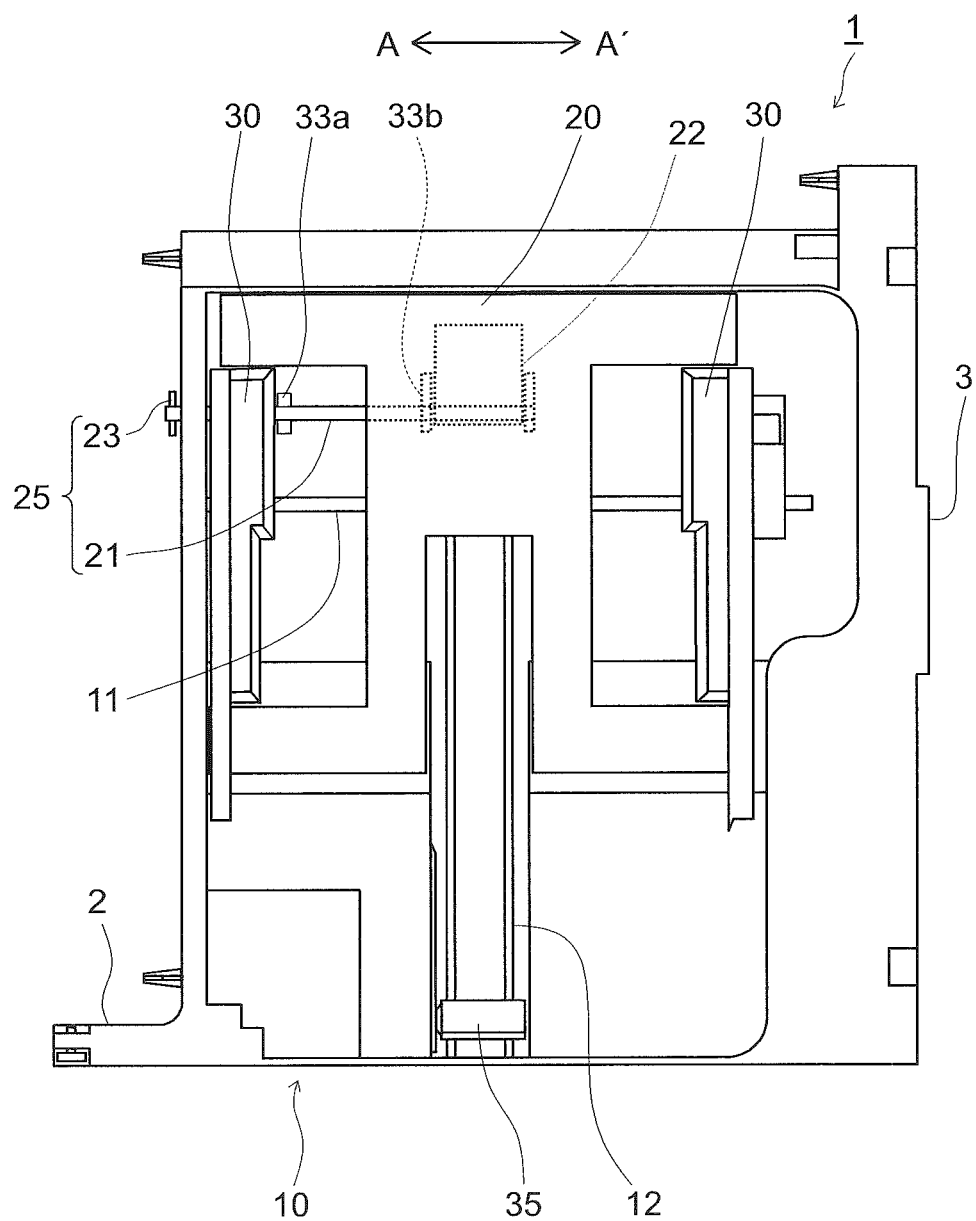
FIG. 3 is a plan view of the paper feed cassette in the paper feed device in the embodiment of the present disclosure.
Figure 4:
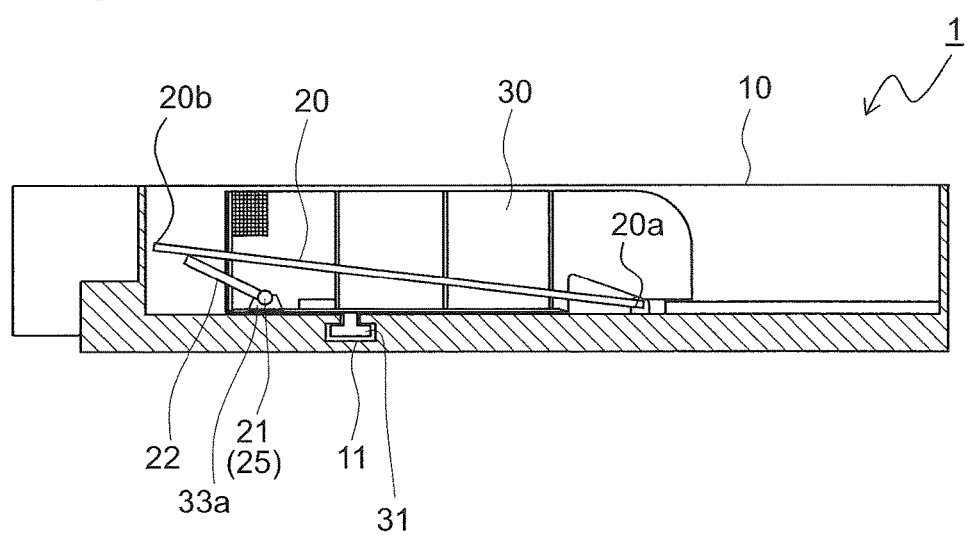
FIG. 4 is a side cross-sectional view of the paper feed cassette in the paper feed device in the embodiment of the present disclosure.
Figure 5:
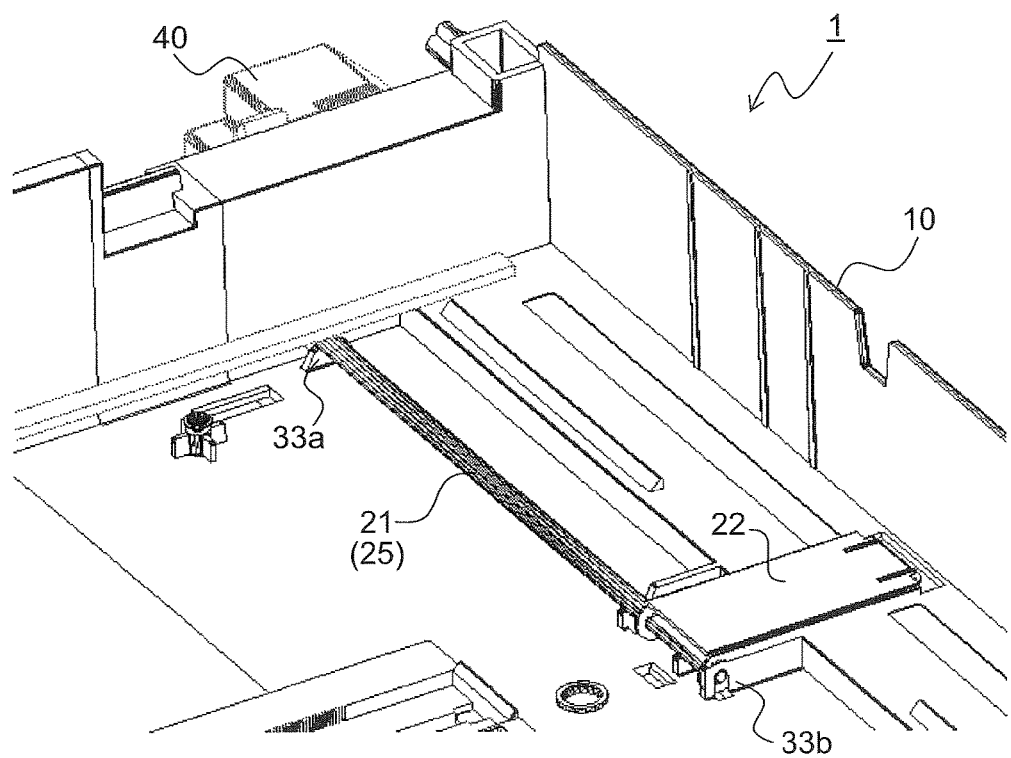
FIG. 5 is a partially enlarged view of the vicinity of an actuation plate of the paper feed cassette in the paper feed device in the embodiment of the present disclosure.

The detailed configuration of the paper feed cassette 1 in the paper feed device of the present disclosure will then be described. FIG. 2 is an external perspective view when the paper feed cassette 1 in the paper feed device in the embodiment of the present disclosure is seen from above the front surface side, FIG. 3 is a plan view of the paper feed cassette 1 in the paper feed device in the embodiment of the present disclosure, FIG. 4 is a side cross-sectional view of the paper feed cassette 1 in the paper feed device in the embodiment of the present disclosure and FIG. 5 is a partially enlarged view of the vicinity of an actuation plate 22 of the paper feed cassette 1 in the paper feed device in the embodiment of the present disclosure. FIG. 5 shows a state where a sheet loading plate 20 is removed.

In FIG. 2, the paper feed cassette 1 is stored in the cassette-type paper feed portion 101 of the image forming apparatus 100 shown in FIG. 1. The paper feed cassette 1 is made to slide horizontally in the direction of an arrow A shown in FIG. 2 so as to be inserted by engaging a horizontal protrusion 2 provided on the side surface of a cassette main body (sheet storage portion) 10 with an unillustrated rail within the image forming apparatus 100.

The cassette main body 10 is formed in the shape of a flat box with its upper surface open, and the sheet is loaded from the direction of the upper surface and is stored. Within the image forming apparatus 100, the paper feed mechanism 117 (see FIG. 1) is arranged above the paper feed cassette 1, and the sheet is supplied in the direction of an arrow B shown in FIG. 2. In the front surface portion of the cassette main body 10, an exterior cover 3 is integrally formed, and the exterior cover 3 forms part of a housing in a lower portion of the front surface of the image forming apparatus 100.

In the inside of the bottom surface of the cassette main body 10, the sheet loading plate 20 is provided. The sheet is loaded on the sheet loading plate 20. The sheet loading plate 20 and the raising/lowering mechanism of the sheet loading plate 20 will be described later.

Within the cassette main body 10, a pair of width restriction cursors 30 are provided so as to stand along the paper feed direction (the direction of the arrow B). The width restriction cursors 30 locate the width direction of the sheets such that the width restriction cursors 30 make contact with the side surface of a sheet bundle from both sides in the sheet width direction perpendicular to the paper feed direction and that thus the sheets are located in a paper feed position from which the sheets are fed by the paper feed mechanism 117. The width restriction cursors 30 can be moved along a width restriction cursor movement groove 11 which is provided in the inside of the bottom surface of the cassette main body 10 and which is extended in the sheet width direction.

As shown in FIG. 4, on a lower portion of the width restriction cursor 30, a groove engagement portion 31 is provided, and the groove engagement portion 31 is engaged with the width restriction cursor movement groove 11 formed in the bottom surface of the cassette main body 10, with the result that the width restriction cursor 30 is prevented from being disengaged from the cassette main body 10. In the pair of width restriction cursors 30 which make contact with the side surfaces of the sheet bundle from both sides in the sheet width direction, by an unillustrated interlocking mechanism provided therebelow, as one of them is moved, the other is moved in an interlocking manner. Here, the pair of width restriction cursors 30 are moved laterally symmetrically with respect to the center line of the sheet in the width direction.

On the upstream side in the paper feed direction within the cassette main body 10, a back end restriction cursor 35 is provided. The back end restriction cursor 35 locates the paper feed direction of the sheets such that the back end restriction cursor 35 makes contact with the side surface of the sheet bundle from the upstream side in the paper feed direction, and that thus the sheets are located in the paper feed position from which the sheets are fed by the paper feed mechanism 117. The back end restriction cursor 35 can be moved along a back end restriction cursor movement groove 12 which is provided in the inside of the bottom surface of the cassette main body 10 and which is extended in the paper feed direction. As in the width restriction cursors 30, in the back end restriction cursor 35, an unillustrated groove engagement portion provided in the lower portion is engaged with the back end restriction cursor movement groove 12, and thus the back end restriction cursor 35 is prevented from being disengaged from the cassette main body 10.

In the sheet loading plate 20, the end portion on the upstream side in the paper feed direction serves as a rotation support point 20a, and thus the sheet loading plate 20 is supported to the inside of the bottom surface of the cassette main body 10, and the end portion on the downstream side in the downstream side in the paper feed direction serves as a free end 20b and thus the sheet loading plate 20 can be rotated vertically. The sheet loading plate 20 is a plate-shaped member, and notches are provided in the regions of the movements of the width restriction cursors 30 and the back end restriction cursor 35.

Below the vicinity of the free end 20b of the sheet loading plate 20, an actuation plate drive shaft (shaft portion) 21 is arranged. The actuation plate drive shaft 21 is rotatably supported to bearing portions 33a and 33b which are formed in the inside of the bottom surface of the cassette main body 10. The actuation plate (driven member) 22 is fixed to one end (an end portion in the direction of an arrow A') of the actuation plate drive shaft 21. The actuation plate 22 is arranged in a position opposite a substantially central portion of the back surface of the sheet loading plate 20 in the sheet width direction.

An engagement pin 23 which is extended in a direction perpendicular to the actuation plate drive shaft 21 is fixed to the other end (the end portion in the direction of the arrow A) of the actuation plate drive shaft 21. The actuation plate drive shaft 21 and the engagement pin 23 form a drive transmission member 25. The engagement pin 23 is protruded outward from the side surface on the downstream side (the side opposite to the exterior cover 3) with respect to the direction in which the cassette main body 10 is inserted into the image forming apparatus 100, and is coupled to an actuation plate drive source 40 provided in the image forming apparatus 100 when the paper feed cassette 1 is inserted into the image forming apparatus 100. The actuation plate drive source 40 and the paper feed cassette 1 form the paper feed device (sheet feed device).

Although FIG. 4 shows a state where the free end 20b of the sheet loading plate 20 is raised by the actuation plate 22, in a state where the engagement pin 23 of the actuation plate drive shaft 21 is not coupled to the actuation plate drive source 40, the actuation plate 22 is arranged in a position (first position) in which the actuation plate 22 falls down along the bottom surface of the cassette main body 10, and the free end 20b of the sheet loading plate 20 is lowered to the lowest position.

When in a state where the actuation plate 22 is in the first position, the engagement pin 23 is coupled to the actuation plate drive source 40, and thus the actuation plate drive source 40 is driven, the actuation plate drive shaft 21 is rotated, the actuation plate 22 is rotated in a clockwise direction in FIG. 4 and thus the free end of the actuation plate 22 is made to slide along the back surface of the sheet loading plate 20, with the result that the free end 20b of the sheet loading plate 20 is raised and is moved upward. In this way, the uppermost layer of the sheets loaded on the sheet loading plate 20 makes contact with the pickup roller 113 of the paper feed mechanism 117 provided in the image forming apparatus 100, and furthermore, the sheets are separated by the paper feed roller pair 115 one by one and are fed from the paper feed cassette 1 to the sheet transport portion 103.

As the sheets loaded on the sheet loading plate 20 are supplied, the amount of rotation of the actuation plate drive source 40 is increased, and thus the amount of rotation of the actuation plate 22 is increased, with the result that an angle formed by the bottom surface of the cassette main body 10 and the actuation plate 22 is increased. Then, when all the sheets P loaded on the sheet loading plate 20 are supplied, the actuation plate 22 is arranged in a position (second position) in which the actuation plate 22 stands only at a predetermined angle from the bottom surface of the cassette main body 10, and the free end 20b of the sheet loading plate 20 is raised to the highest position.

Figure 6:
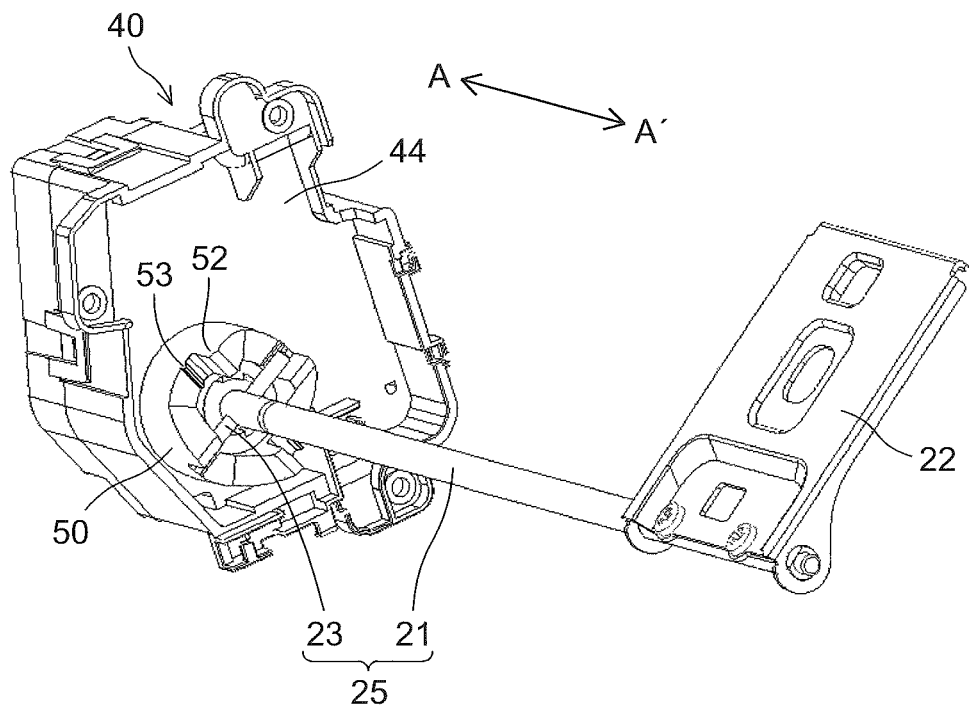
FIG. 6 is a perspective view showing the structures of the actuation plate, a drive transmission member and an actuation plate drive source in the paper feed device in the embodiment of the present disclosure.
Figure 7:
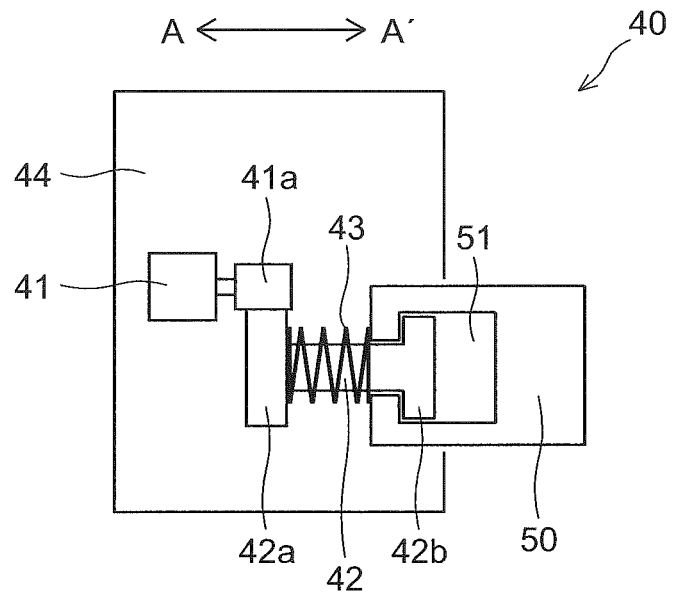
FIG. 7 is a cross-sectional view showing the internal structure of the actuation plate drive source in the paper feed device in the embodiment of the present disclosure.
Figure 8:
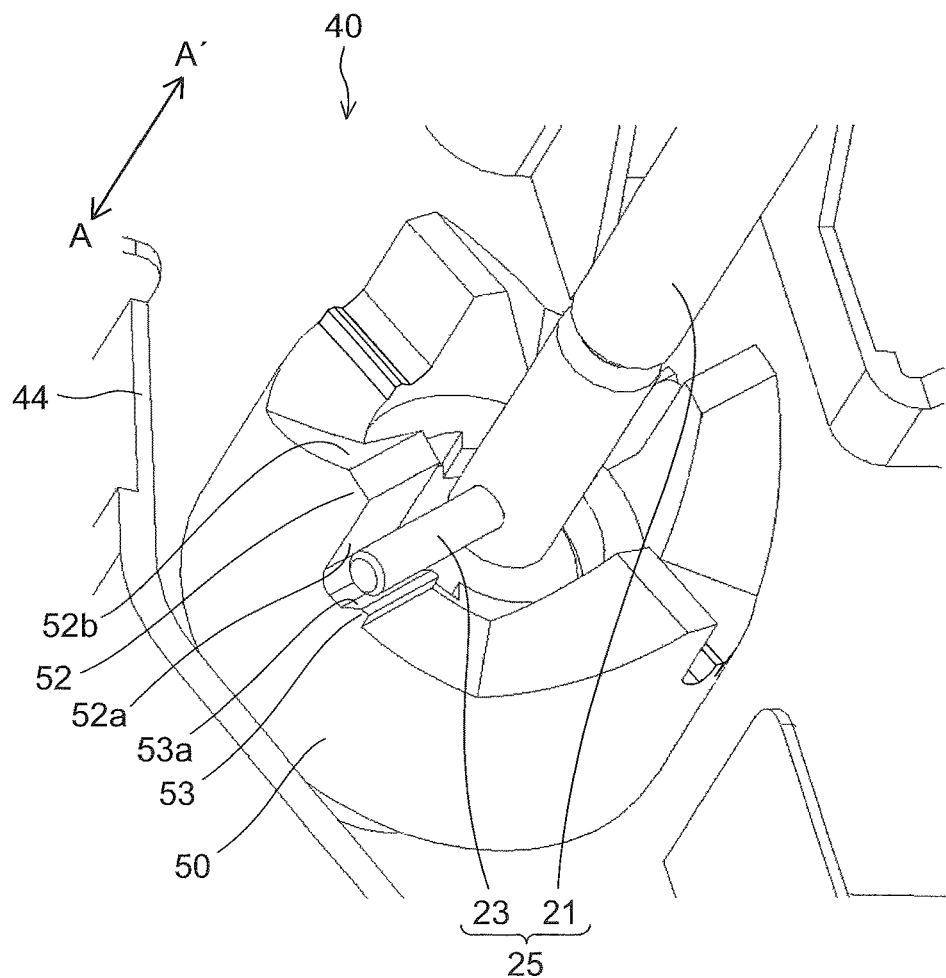
FIG. 8 is an enlarged perspective view showing the structure of the vicinity of a coupling member in the paper feed device in the embodiment of the present disclosure.

FIG. 6 is a perspective view showing the structures of the actuation plate 22, the drive transmission member 25 and the actuation plate drive source 40 in the paper feed device in the embodiment of the present disclosure. FIG. 7 is a cross-sectional view showing the internal structure of the actuation plate drive source 40 in the paper feed device in the embodiment of the present disclosure. FIG. 8 is an enlarged perspective view showing the structure of the vicinity of a coupling member 50 in the paper feed device in the embodiment of the present disclosure.

As shown in FIGS. 6 and 7, the actuation plate drive source 40 is formed with a drive motor 41, a shaft member 42 to which a gear portion 42a that is engaged with a pinion gear 41a fixed to the rotation shaft of the drive motor 41 is fixed, the coupling member 50 which is provided at a tip end portion 42b of the shaft member 42 and which is engaged with the engagement pin 23, a biasing member 43 which biases the coupling member 50 in the direction (the direction of the arrow A') of the engagement pin 23 and which is formed with a compression coil spring and a housing 44 which holds them. The drive transmission member 25, the coupling member 50 and the biasing member 43 form a coupling mechanism.

In the coupling member 50, an insertion hole 51 is formed, and the tip end portion 42b of the shaft member 42 is inserted into the insertion hole 51. In the inner surface of the insertion hole 51, an engagement groove (not shown) is formed which is extended in the direction of the arrows A and A' and which is engaged with the outer circumferential surface of the tip end portion 42b of the shaft member 42, and the coupling member 50 is rotated together with the shaft member 42. The coupling member 50 is slidably formed with respect to the shaft member 42 in the axial direction (the direction of the arrows A and A').

As shown in FIGS. 6 and 8, the coupling member 50 is arranged coaxially with the actuation plate drive shaft 21. On a portion of the coupling member 50 on the side of the drive transmission member 25 (the direction of the arrow A'), a plurality of (here, four) engagement protrusions 52 which are protruded to one side (the direction of the arrow A') of the actuation plate drive shaft 21 in the axial direction are provided at regular intervals in a circumferential direction. The engagement pin 23 is inserted between the engagement protrusions 52, and thus the engagement protrusions 52 and the engagement pin 23 are engaged with each other in the circumferential direction.

The engagement protrusion 52 includes a pressing surface 52a which is parallel to the axial direction (the direction of the arrows A and A') of the actuation plate drive shaft 21 and an inclination surface 52b which is inclined with respect to the direction of the arrows A and A' so as to approach the tip end portion of the pressing surface 52a in the axial direction, and is tapered in the direction of the arrow A'. When the coupling member 50 is positively rotated (rotated in a counterclockwise direction when seen from the side of the actuation plate drive shaft 21), the pressing surface 52a presses the engagement pin 23 to rotate (positively rotate) the engagement pin 23 in the same direction. When the coupling member 50 is reversely rotated (rotated in a clockwise direction when seen from the side of the actuation plate drive shaft 21), the inclination surface 52b presses the engagement pin 23 to rotate (reversely rotate) the engagement pin 23 in the same direction, and moves the coupling member 50 in the direction of the arrow A by a reaction force from the engagement pin 23. Hence, when the coupling member 50 is reversely rotated, and a load which is equal to or more than a predetermined value is applied from the engagement pin 23 thereto, the coupling member 50 is made to slide, in the direction of the arrow A, only the same distance as the amount of protrusion of the engagement protrusion 52 in the direction of the arrow A' and the engagement pin 23 rides over the engagement protrusion 52.

Figure 9:
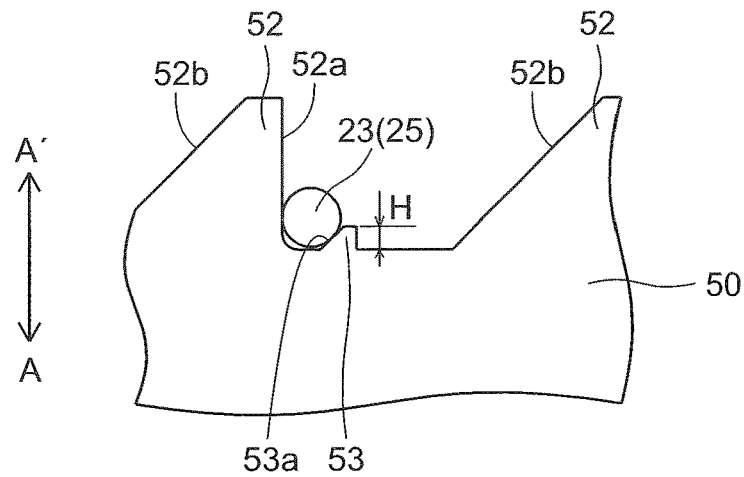
FIG. 9 is a diagram showing the structure of the vicinity of a holding protrusion of the coupling member in the paper feed device in the embodiment of the present disclosure.

As shown in FIGS. 8 and 9, between the engagement protrusions 52, a plurality of (here, four) holding protrusions 53 are provided which are protruded a smaller amount of protrusion H than the engagement protrusions 52 in the direction of the arrow A'. The holding protrusion 53 is arranged in such a position as to make contact with the engagement pin 23 in a state where the engagement pin 23 makes contact with the pressing surface 52a.

The holding protrusion 53 includes a contact surface 53a which makes contact with the engagement pin 23 in a state where the engagement pin 23 makes contact with the pressing surface 52a. The contact surface 53a is formed so as to move away from the pressing surface 52a (so as to be inclined in the same direction as the inclination surface 52b) as the contact surface 53a is extended in the direction of the arrow A'. The amount of protrusion H of the holding protrusion 53 in the direction of the arrow A' is smaller than the radius of the engagement pin 23.

When the coupling member 50 is reversely rotated, the holding protrusion 53 presses the engagement pin 23 to rotate (reversely rotate) the engagement pin 23 in the same direction, and moves the coupling member 50 in the direction of the arrow A by a reaction force from the engagement pin 23. Hence, when the coupling member 50 is reversely rotated, and a load which is equal to or more than a predetermined value is applied from the engagement pin 23 to the holding protrusion 53, the coupling member 50 is made to slide in the direction of the arrow A and the engagement pin 23 rides over the holding protrusion 53.

When the drive motor 41 and the coupling member 50 are positively rotated, the pressing surface 52a presses the engagement pin 23, and thus the actuation plate drive shaft 21 is positively rotated. In this way, the actuation plate 22 is rotated to stand up, and thus the sheet loading plate 20 is raised.

When in this state, the paper feed cassette 1 is removed from the main body of the image forming apparatus 100, and the engagement of the drive transmission member 25 and the coupling member 50 is released, the actuation plate 22 and the sheet loading plate 20 may be damaged by being rapidly rotated in the direction in which the actuation plate 22 and the sheet loading plate 20 fall down. Hence, when the paper feed cassette 1 is removed from the main body of the image forming apparatus 100, it is necessary to reversely rotate the drive motor 41 to make the actuation plate 22 and the sheet loading plate 20 fall down. Therefore, when a sheet sensor (not shown) detects that the sheets P within the paper feed cassette 1 run out, the drive motor 41 is driven to reversely rotate.

When the drive motor 41 and the coupling member 50 are reversely rotated, since the holding protrusion 53 presses the engagement pin 23 in the reverse rotation direction, the actuation plate drive shaft 21 follows the coupling member 50 so as to reversely rotate. In this way, the actuation plate 22 is rotated to fall down, and thus the sheet loading plate 20 is lowered.

In the present embodiment, as described above, when the coupling member 50 is reversely rotated, a load in the reverse rotation direction is applied to the engagement pin 23 from the holding protrusion 53. In this way, for example, even when a friction force between the actuation plate 22 and the sheet loading plate 20 is large or even when the actuation plate 22 substantially vertically makes contact with the back surface of the sheet loading plate 20 (even when the sheets P within the paper feed cassette 1 run out), the coupling member 50 is reversely rotated, and thus the drive transmission member 25 follows the coupling member 50 so as to reversely rotate by the load of the holding protrusion 53 in the reverse rotation direction. Here, since the holding protrusion 53 makes contact with the engagement pin 23 in a state where the engagement pin 23 makes contact with the pressing surface 52a, and thus the coupling member 50 is prevented from being idled, the drive transmission member 25 is prevented from being rapidly reversely rotated, and the actuation plate 22 and the sheet loading plate 20 are prevented from rapidly falling down, with the result that it is possible to restrain abnormal noise.

When the coupling member 50 is reversely rotated, and a load which is equal to or more than a predetermined value is applied from the holding protrusion 53 and the engagement protrusion 52, the engagement pin 23 rides over the holding protrusion 53 and the engagement protrusion 52. In this way, even when the drive motor 41 runs away due to a failure or the like, and thus the reverse rotation of the coupling member 50 is prevented from being stopped, since the engagement pin 23 rides over the holding protrusion 53 and the engagement protrusion 52, it is possible to prevent a load equal to or more than a predetermined value from being continuously applied to the engagement pin 23. Hence, it is possible to reduce the damage of the engagement pin 23, the actuation plate 22, the sheet loading plate 20 and the like.

The coupling member 50 is provided such that the coupling member 50 can be moved in the direction of the arrows A and A'. In this way, when the coupling member 50 is reversely rotated, and a load which is equal to or more than a predetermined value is applied to the engagement pin 23 from the holding protrusion 53 and the engagement protrusion 52, the coupling member 50 is moved in the direction (the direction of the arrow A) in which the coupling member 50 is moved away from the engagement pin 23, and thus the engagement pin 23 can easily ride over the holding protrusion 53 and the engagement protrusion 52.

As described above, the contact surface 53a of the holding protrusion 53 is formed so as to move away from the pressing surface 52a as the contact surface 53a is extended in the direction of the arrow A'. In this way, when the coupling member 50 is reversely rotated, and a load which is equal to or more than a predetermined value is applied to the engagement pin 23 from the holding protrusion 53, the holding protrusion 53 can be easily moved in the direction (the direction of the arrow A) in which the holding protrusion 53 is moved away from the engagement pin 23, and thus the engagement pin 23 can easily ride over the holding protrusion 53.

As described above, the amount of protrusion H of the holding protrusion 53 in the direction of the arrow A' is smaller than the radius of the engagement pin 23. In this way, when the coupling member 50 is reversely rotated, and a load which is equal to or more than a predetermined value is applied to the engagement pin 23 from the holding protrusion 53, the holding protrusion 53 can be easily moved in the direction in which the holding protrusion 53 is moved away from the engagement pin 23.

The embodiment disclosed herein should be considered to be illustrative in all respects and not restrictive. The scope of the present disclosure is indicated not by the description of the embodiment discussed above but by the scope of claims, and furthermore, all modifications within the meaning and scope equivalent to the scope of claims are included.

For example, although the example where the present disclosure is applied to a monochrome copying machine is described, the present disclosure is not limited to this example. It is needless to say that the present disclosure can be applied to various image forming apparatuses, such as a color copying machine, a monochrome printer, a color printer, a digital multifunctional machine and a facsimile machine, which include a sheet storage cassette and a coupling member.

Although in the embodiment discussed above, the example where the same number of holding protrusions 53 as the engagement protrusions 52 are provided is described, the present disclosure is not limited to this example. For example, a configuration in which in the embodiment described above, the engagement pin 23 is protruded from the actuation plate drive shaft 21 in four directions is adopted, and thus the number of holding protrusions 53 can also be set to only one.

What is claimed is:

1. A coupling mechanism comprising:
a drive transmission member that includes a shaft portion to which a driven member is fixed and an engagement pin which is fixed to an end portion of the shaft portion on a side opposite to the driven member and which is extended in a direction intersecting the shaft portion;
a coupling member that includes a plurality of engagement protrusions which are protruded in an axial direction of the shaft portion and which are engaged with the engagement pin and a holding protrusion which is arranged between the engagement protrusions and which is protruded in the axial direction a smaller amount of protrusion than the engagement protrusion and that is provided such that the coupling member can be moved in the axial direction; and
a biasing member that biases the coupling member in a direction in which the coupling member is engaged with the drive transmission member,
wherein the engagement protrusion includes a pressing surface which is parallel to the axial direction and an inclination surface which is inclined toward a tip end portion of the pressing surface in the axial direction,
the holding protrusion is arranged in such a position as to make contact with the engagement pin in a state where the engagement pin makes contact with the pressing surface, and
the engagement pin is pressed by the pressing surface when the coupling member is positively rotated, a rotation drive force in a positive rotation direction is transmitted from the coupling member to the engagement pin, a load in a reverse rotation direction is applied from the holding protrusion to the engagement pin when the coupling member is reversely rotated and the engagement pin rides over the holding protrusion and the engagement protrusion when a load which is equal to or more than a predetermined value is applied from the holding protrusion and the engagement protrusion.

2. The coupling mechanism according to claim 1,
wherein the holding protrusion includes a contact surface which makes contact with the engagement pin in a state where the engagement pin makes contact with the pressing surface, and
the contact surface is formed so as to be inclined in the same direction as the inclination surface.

3. The coupling mechanism according to claim 1,
wherein the amount of protrusion of the holding protrusion in the axial direction is smaller than a radius of the engagement pin.

4. A sheet feed device comprising:
the coupling mechanism according to claim 1;
a sheet loading plate in which a sheet is loaded on an upper surface; and
an actuation plate which is fixed to the shaft portion of the coupling mechanism and which is rotated in a state where the actuation plate makes contact with, from below, a portion of the sheet loading plate on a downstream side in a sheet feed direction so as to raise and lower the sheet loading plate.

5. An image forming apparatus comprising:
the sheet feed device according to claim 4.

* * * * *